Raymond W. Moore

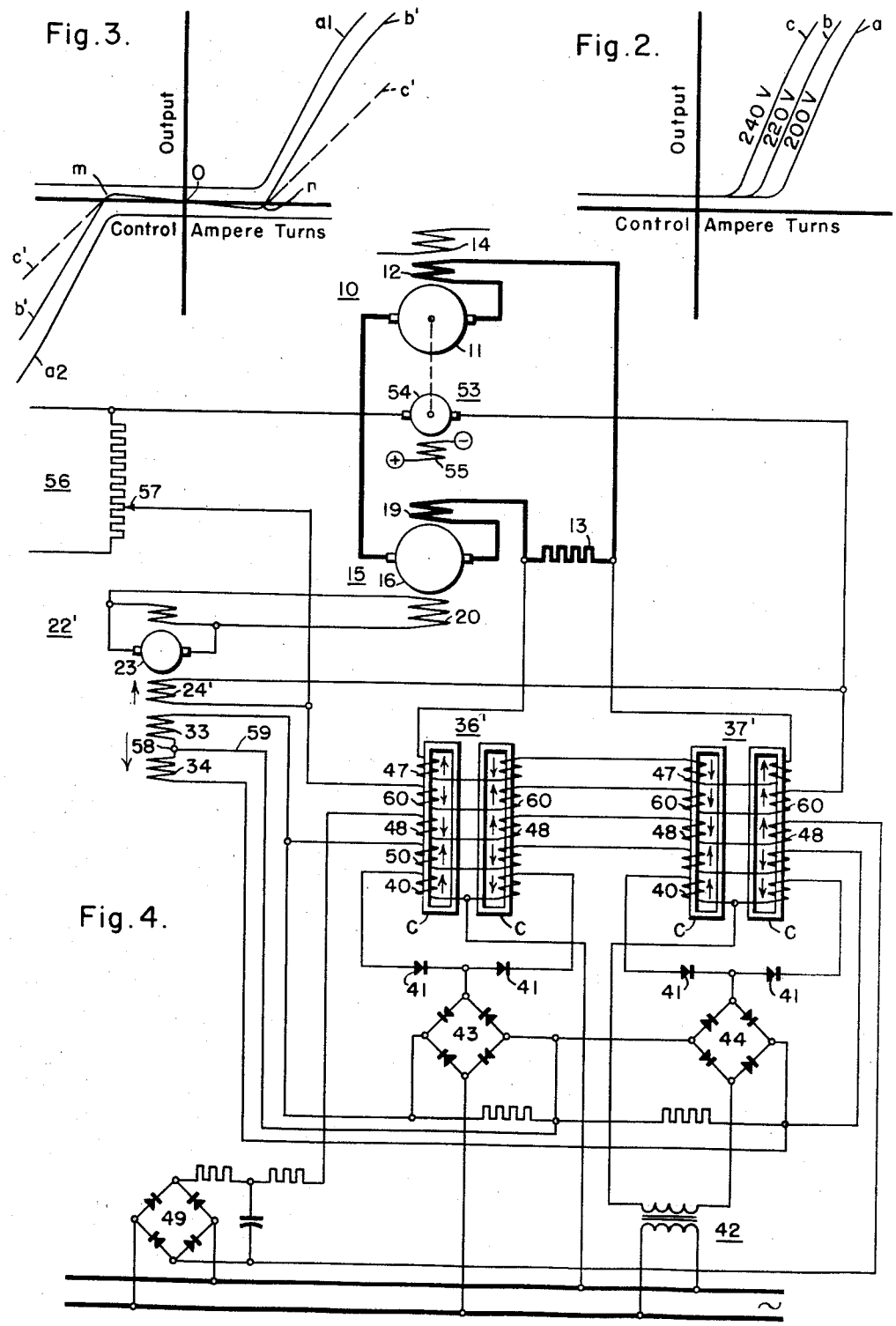

Sept. 23, 1958  R. W. MOORE  2,853,668
MOTOR CONTROL SYSTEMS
Filed Aug. 19, 1954  4 Sheets-Sheet 4
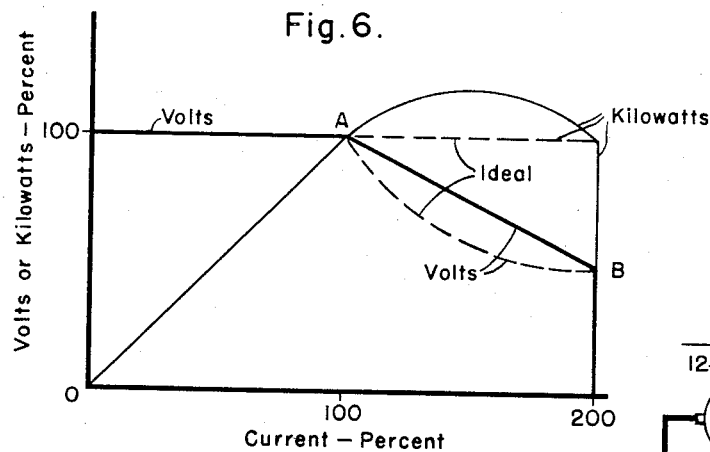
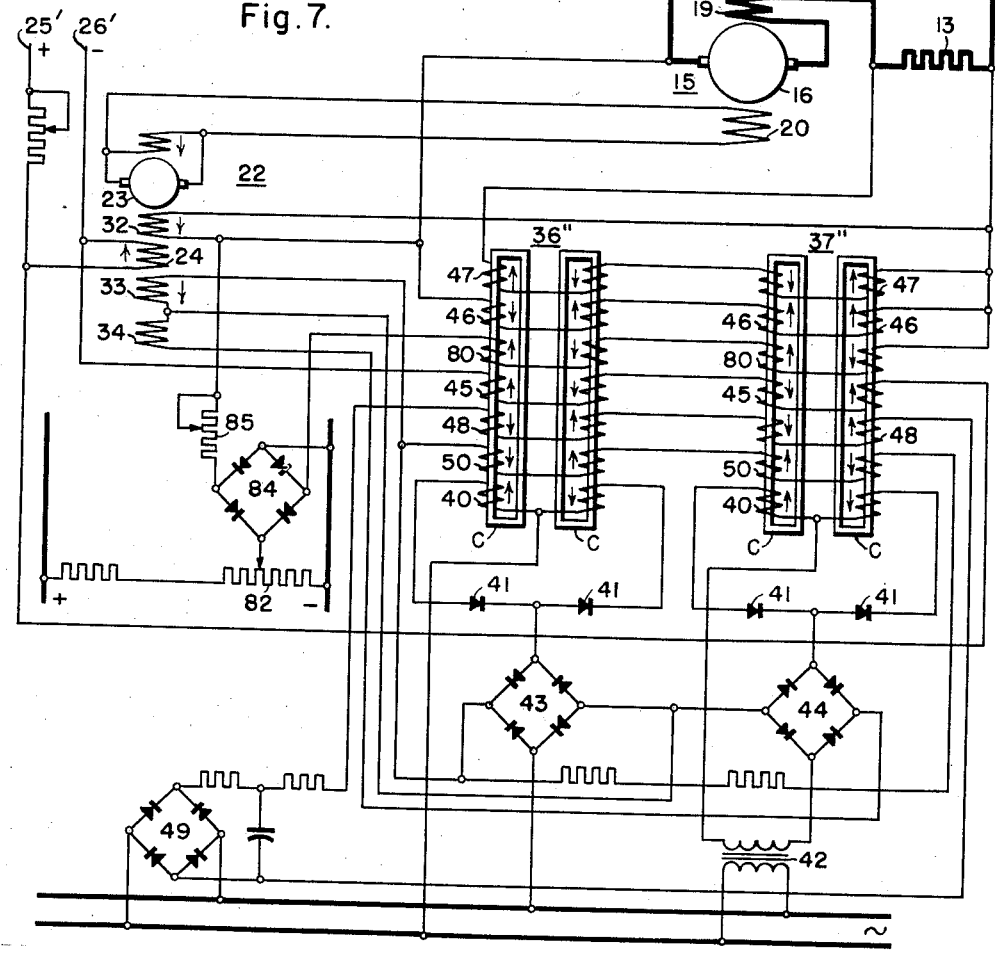

United States Patent Office 2,853,668
Patented Sept. 23, 1958

2,853,668

MOTOR CONTROL SYSTEMS

Raymond W. Moore, Snyder, N. Y., assignor to Westinghouse Electric Corporation, East Pittsburgh, Pa., a corporation of Pennsylvania Application August 19, 1954, Serial No. 450,898

14 Claims. (Cl. 318—143)

My invention relates generally to motor control systems and it has reference in particular, to control systems using limit regulators of the magnetic amplifier type.

Generally stated, it is an object of my invention to provide an improved current limit regulator for a reversing motor drive.

More specifically, it is an object of my invention to provide for improving the accuracy of a current regulator of the magnetic amplifier type.

Another object of my invention is to provide in a magnetic amplifier limit regulator for neutralizing the effects of variations in voltage of the alternating current source.

It is also an object of my invention to provide for neutralizing the effect of variations in the alternating current voltage supply on the cut-off point of a limit type regulator witthout adversely effecting the stability of the system.

It is an important object of my invention to provide for obtaining a bias voltage for a magnetic amplifier from the same source as energizes the alternating-current load winding so as to compensate for the effects of variations in source voltage.

Another important object of my invention is to provide in a limit type magnetic amplifier for using a relatively large bias excitation to obtain maximum correction for variations in the voltage of the alternating voltage source, and for using negative feedback to limit the gain resulting from such bias, so as to maintain a stable system.

Yet another important object of my invention is to provide for using a current limit regulator to supply limit excitation to a speed or voltage regulator and to provide a feedback signal for modifying the operation of the limit regulator in accordance with the rate of change of signal produced by the speed or voltage regulator.

It is also another object of my invention to provide in a limit regulator for using a power control winding for modifying the operation of the regulator to approach an ideal condition of essentially constant power in a variable voltage generator between substantially normal current conditions and the maximum current limit condition.

Other objects will, in part, be obvious and will, in part, be explained hereinafter.

In practicing my invention in accordance with one of its embodiments, a hoist motor is provided with separately excited and series field windings, while the armature thereof is energized from a variable voltage generator. Field excitation for the generator is provided by a regulating generator having a pattern field winding energized from a suitable source through a master switch which both varies and reverses the excitation of the pattern field. A differential voltage field on the regulating generator causes it to control the voltage of the variable voltage generator. Current limit windings on the regulating generator are regulated by magnetic amplifiers which have bias windings energized through rectifiers from an alternating current source which supplies electrical energy to the current limit windings. Feedback windings are utilized on the magnetic amplifiers to limit the gain resulting from a use of the bias windings and thus maintain stable operating conditions.

For a more complete understanding of the nature and scope of my invention, reference may be made to the following detailed description which may be read in connection with the accompanying drawings, in which:

Fig. 2 shows output characteristic curves of a magnetic amplifier with changes in the voltage of the alternating current source;

Fig. 3 shows the output characteristics of a magnetic amplifier embodying feedback according to the invention;

Fig. 4 is a schematic diagram of a speed regulating system for a motor embodying the invention in one of its forms;

Fig. 6 shows characteristic curves for a motor such as used in a shovel drive; and Fig. 7 is a schematic diagram of a control system embodying the invention in one of its forms and applied to a motor used in a shovel drive.

Figure 1:
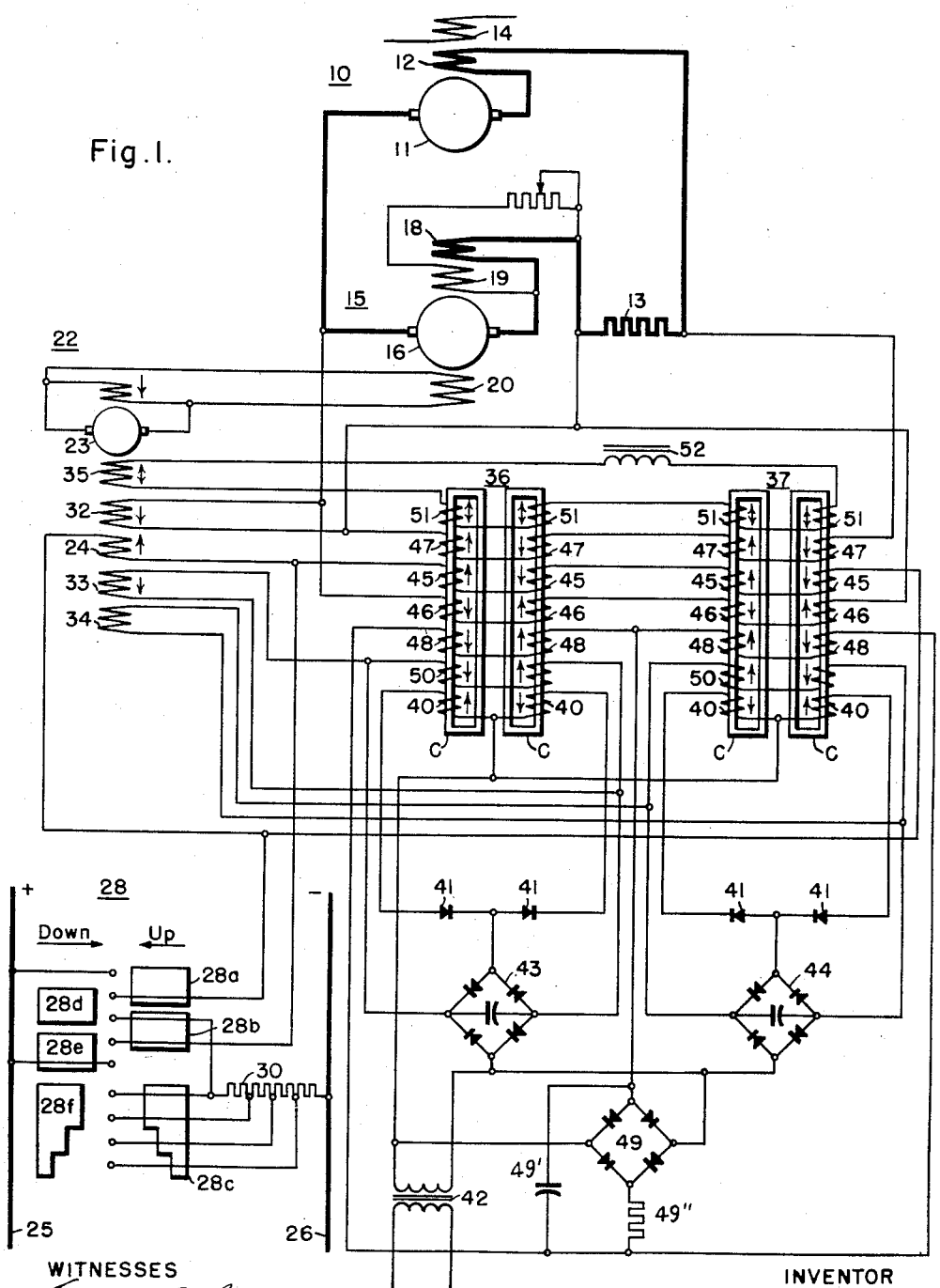
Figure 1 is a schematic diagram of a motor control system embodying the invention in one of its forms.

Referring to Fig. 1, the reference numeral 10 designates a direct current motor having an armature 11, a series field winding 12 and a separately excited field winding 14 which is connected to any suitable source of excitation. The armature 11 is supplied with electrical energy through a resistor 13 from a variable voltage generator 15 having armature 16 connected in series with the armature 11 and a field winding 12 and having a commutating series field winding 18, a series field winding 19 and a separately excited main field winding 20.

Excitation of the field winding 20 is effected by a voltage regulator which is of any suitable type and is herein illustrated as comprising a regulating generator 22. The generator 22 has an armature 23 connected in series with the field winding 20, a pattern field winding 24 which is connected for energization to a bus comprising conductors 25 and 26, through a master switch 28 having contacts 28a, 28b and 28c for connecting the pattern winding to the conductors 25 and 26 through different portions of a control resistor 30 for operating the motor 10 to raise its load. Corresponding contacts 28d, 28e and 28f are provided for connecting the pattern winding 24 in the opposite direction for lowering the load. A differential voltage winding 32 on the regulating generator is connected across the armature 16 for regulating the voltage applied to the armature 11 of the motor. Current limit windings 33 and 34 are provided on the regulating generator 22, the function of which will be explained hereinafter. The regulating generator is further provided with a damper field winding 35, the function of which will be hereinafter explained.

In order to limit the armature current of the motor 10, the current limit windings 33 and 34 are controlled by magnetic amplifiers 36 and 37, each comprising a pair of cores C of magnetic material having a plurality of windings thereon. Each core of a particular pair is provided with load windings 40 being connected in parallel circuit relationship with each other through oppositely disposed rectifier devices 41 in series with the current limit windings 33 and 34 for energizing them from an alternating current source represented by a transformer 42, through rectifier bridge circuits 43 and 44, respectively. The rectifier devices 41 provide for unidirectional flow of current through the respective load windings for effecting self-saturation of the respective cores in a manner well known in the art of magnetic amplifiers.

Bias windings 48 are provided on each of the cores to set the operating conditions of the magnetic amplifiers. Curve $b$ of Fig. 2 shows the control characteristic of magnetic amplifier 36 with a fixed excitation on bias winding 48 and nominal rated alternating supply voltage applied to load winding 40. Curve $a$ is the control characteristic of magnetic amplifier 36 or magnetic amplifier 37 with the same fixed excitation on bias winding 48 but with a lower alternating voltage on load winding 40. Similarly, curve $c$ is the control characteristic with the same fixed bias excitation but with a higher alternating supply voltage. In order to minimize these changes in control characteristics, the bias winding 48 is supplied through rectifier 49 having a filter circuit comprising a capacitor 49' and resistor 49'' in conjunction therewith from the same alternating current source transformer 42 as load winding 40. An increase in excitation voltage on bias winding 48 will have an effect on the control characteristic as illustrated in Fig. 2 opposite to an increase in voltage applied to load winding 40. Similarly, a decrease in excitation voltage of bias winding 48 has an opposite effect to a decrease in voltage applied to load winding 40. Therefore, with a bias winding excitation obtained as in Fig. 1, the changes in control characteristics with A.-C. supply voltage are minimized.

To effectively reduce the differences in magnetic amplifier control characteristics with changes in supply voltage as described above, the bias excitation must be relatively large. However, when magnetic amplifiers 36 and 37 are used to control the rotating amplifier 22 the overall control characteristic obtained is curve $b'$ of Fig. 3. This is effectively the sum of curves $a1$ and $a2$, which are the individual control characteristics of magnetic amplifiers 36 and 37. The width of the deadband of the combination of amplifiers 36 and 37 is illustrated as $m$—$0$—$n$ in Fig. 3. It is evident that this width of deadband is functionally proportional to the amount of bias excitation on each of the individual amplifiers. Magnetic amplifiers 36 and 37 have current windings 47 which are connected across resistor 13. The more ampere turns in bias windings 48, the wider the deadband of amplifiers 36 and 37 is, and therefore the more ampere turns in current limit winding 47 are required, to limit armature current in motor 10 to a given value. Thus, indirectly the gain of the current limit regulator is increased when large bias excitation is used. Since too high a current limit regulator gain results in system instability, feedback windings 50 are provided on each of the pair of cores and connected in parallel with their respective current limit windings 33 and 34, so as to reduce the gain of the current limit regulator to a suitable value. This is illustrated by curve $c'$ in Fig. 3. In addition to the function previously described, feedback winding 50 has the additional advantage of providing individual adjustments of magnetic amplifiers 36 and 37 to minimize the inherent difference which often occurs in magnetic amplifiers. The combined output characteristic of magnetic amplifiers 36 and 37 is therefore $c'$—$n$—$0$—$m$—$c'$ of Fig. 3 and results in a net output appearing in windings 33 and 34 of regulating generator 22 in accordance with this curve.

In addition to the current limit winding, each of the cores of magnetic amplifiers 36 and 37 are provided with a pattern winding 45 connected to conductors 22 and 26 through master switch 28, and a differential voltage winding 46. The function of windings 45 and 47 will be hereinafter explained. In addition to the aforementioned windings, a rate feedback winding 51 may be provided on each of the cores and connected to the damper winding 35 on the regulating generator 22 through a delaying reactor 52. This produces a feedback proportional to the rate of change of voltage of the regulator 22 and helps to prevent overshoot in the operation of the regulating generator 22.

In order to more fully explain the limiting operation, the necessary relative adjustments of each of the remaining windings on amplifiers 36 and 37 will be described. Referring to Fig. 3 as has been previously explained, the output characteristic of the combination of amplifiers 36 and 37, which is $c'$ (first quadrant) $n$—$0$—$m$ $c'$ (third quadrant) is achieved by adjustment of bias winding 48 which determines the relative distance $m$—$0$—$n$, and the adjustment of feedback winding 50 determines the slope of $n$—$c$ and $m$—$c'$. The ampere turn strength of winding 47 which is proportional to the armature current of motor 11 is so adjusted to be equal to the magnitude of ampere turns $0$—$n$, Fig. 3 when the armature current of motor 10 is at the desired limit value and is in such a direction as to cause the operating point of amplifiers 36 and 37 to move from 0 to $n$ to $c'$ when the armature current in motor 10 is in the "up" direction.

The adjustment of the ampere turn strength of winding 45 is made in the following manner. A fixed excitation is applied to winding 47 of magnetic amplifiers 36 and 37 to bring their operating point to $n$ of the output characteristic, Fig. 3. With field winding 20 of generator 16 open, the switch 28 is moved in the "up" direction to excite winding 24 of the regulating generator 22 and winding 45 of magnetic amplifiers 36 and 37. Then the ampere turn strength of winding 45 is adjusted such that the ampere turns in winding 33 of regulating generator 22, which result from output of magnetic amplifiers 36 and 37, because of excitation on winding 45, is just sufficiently less than the ampere turns in winding 24 of regulating generator 22, resulting from movement of master switch 28 which is required to excite generator 14 to cause armature current to flow such that the voltage drop across resistor 13 when motor 10 is carrying current of the desired limit value but with the armature stalled is equal to the fixed voltage across winding 47.

To adjust the ampere turn strength of winding 46, the fixed excitation on winding 47 remains as in the previous adjustment of winding 45, and the master switch is placed in the "off" position. A fixed excitation source is now used in place of generator 16 to excite windings 32 and 46 except the polarity of winding 46 is reversed for the adjustment only. Then the strength of winding 46 is adjusted such that the output of magnetic amplifiers 36 and 37 appearing in winding 33 just cancels the ampere turns of winding 32. Thus, when the connections of windings 32 and 46 are made, with winding 46 connected for proper polarity, there will be no change in net excitation of windings 32 and 33 when the voltage of generator 16 changes if amplifiers 36 and 37 are operating on the $n$—$c'$ first quadrant or $m$—$c'$ third quadrant part of their output characteristic.

Since the limit system as described is a feedback control system, proper damping is achieved by adjustment of the ampere-turn strength of winding 51.

In operation, the regulating generator 22 normally operates as a voltage regulator with the voltage winding 32 balancing the pattern winding 24 to maintain a predetermined armature voltage for the generator 15. During acceleration or reversal when there is a tendency for the armature current to increase to excessive amounts, this effect is utilized through the current windings 47 of the magnetic amplifiers 36 and 37 to effect energization of either the windings 33 or 34, depending on whether the motor is hoisting or lowering, to modify the regulating effect of the generator 32 so as to limit the maximum value of the current, whereas in normal operation, the voltage field winding 32 substantially balances the effects of the pattern field winding 24, during reversal when the generator voltage is reduced and passes through zero, the limit field windings 33 and 34 operate to oppose the pattern field winding 24 taking the place of the voltage winding during the transition period and thus holding the armature current at more or less a constant value during this change, instead of allowing it to raise to a peak and then taper off gradually as would otherwise be the result.

The specific functions of pattern winding 45 and voltage winding 46 on magnetic amplifiers 36 and 37 can now be understood. With master switch 28 in the center or zero position, the outputs of regulating generator 22 and generator 15 are zero, motor 10 is at a standstill and the armature current of motor 10 is zero. When master switch 28 is moved off-center in the "up" direction, excitation is supplied to regulating generator 22 by pattern field 24 and the output voltage of generator 22 increases as does that of generator 15, and therefore, armature current in motor 10 increases.

Initially, armature 11 of motor 10 will not revolve so that it will develop no counter E. M. F. Accordingly it requires practically no voltage to circulate rated current, and therefore the voltage applied to differential winding 32 on regulating generator 22 and on voltage winding 46 of magnetic amplifiers 36 and 37 will be so low as to be substantially zero. Under these conditions, the current of motor 10 can reach a value such that the ampere turns in current winding 47 are equal to 0—$n$ of curve $c'$ in Fig. 3. By previous adjustment, the amount of ampere turns on winding 45 are of such a value that magnetic amplifier 36 will supply current to winding 33 of regulating generator 22 to cancel all the ampere turns of winding 24 except those just sufficient to maintain output of regulating generator 22 so that the chosen amount of armature current flows in motor 10 to maintain the value of ampere turns in winding 47 equal to 0—$n$.

When motor 10 starts to accelerate, a voltage appears across windings 32 and 46. Adjustments can be previously made such that the effect of winding 46 on magnetic amplifier 36 is to reduce its output such that the decrease in ampere turns in winding 33 is the same as the increase in ampere turns in winding 32. Thus, the current in motor 10 is maintained effectively at a value proportional to 0—$n$ until the system arrives at a condition where the torque requirements of motor 10 call for less than this current. Relative flux directions for the "up" direction are shown for the rotating and magnetic amplifier regulators.

Referring to Fig. 4, the reference numeral 10 designates a motor having an armature 11 with a series field winding 12 and a separately excited main field winding 14. The armature 11 is supplied with electrical energy by means of a generator 15 having an armature 16 connected in series with the armature 11 and having series and main field windings 19 and 20 respectively.

A regulating generator 22' is provided having an armature 23 connected in series with the main field winding 20 and provided with a control field winding 24' and current limit windings 33 and 34 respectively.

In order to regulate the speed of the motor 10, a pilot generator 53 is provided having an armature 54 driven by the motor 10 and a field winding 55 which is connected to a suitable source of excitation. The control field winding 24' is connected in circuit with the armature 54 of the pilot generator and a reversible reference source 56 by means of a rheostat 57. The voltages of the pilot generator and the reference source being in opposition, the control winding 24' is energized in accordance with the differential therebetween, and controls the excitation of the field winding 20 accordingly, to maintain a predetermined motor speed for a given setting of the rheostat 57.

The current limit windings 33 and 34 are energized through magnetic amplifiers 36' and 37', the cores C of which are provided with load windings 40 connecting the current limiting windings 33 and 34 through rectifier circuits 43 and 44 to an alternating current source directly and through a transformer 42, respectively, so as to permit the use of a common terminal connection 58 between the two current limit windings. Bias windings 48 are provided on each of the cores and are energized from the same alternating current source through a rectifier circuit 49 and so connected as described to obtain a control characteristic illustrated in Fig. 3. Instead of using separate pattern and control windings as in Fig. 1, error windings 60 are provided on each of the cores and are connected in series across the control winding 24' of the regulating generator, so as to be energized in accordance with the differential between the reference source 56 and the pilot generator 53. Feedback windings 50 are also provided on the cores and are connected across their respective current limit windings so as to be energized differentially with respect to the load winding in accordance with the excitation provided to the load limit windings. The arrows show relative flux directions for the magnetic amplifiers and regulator 22' for the "up" direction.

In operation, the excitation of the control field winding 24' will vary in opposite senses and amounts in accordance with the direction and degree of differential between the voltage from the source and the pilot generator 53 which is responsive to the speed of the motor 10, thus causing the regulating generator 22' to control the voltage applied to the armature 11 of the motor to maintain a predetermined speed. Whenever the armature current exceeds a predetermined amount as determined by the excitation of the bias winding 48 the magnetic amplifiers 36' and 37' will be selectively operable to effect energization of the current limit windings 33 and 34 respectively to reduce the speed for which the regulator 22' is regulating in order to maintain the armature current below the predetermined desired maximum value. Since a single control winding is used on regulating generator 22', therefore, a single error winding 60 can be used on magnetic amplifiers 36' and 37', Fig. 4, to accomplish the same functions and pattern and control windings 45 and 46, respectively, of Fig. 1.

Figure 5:
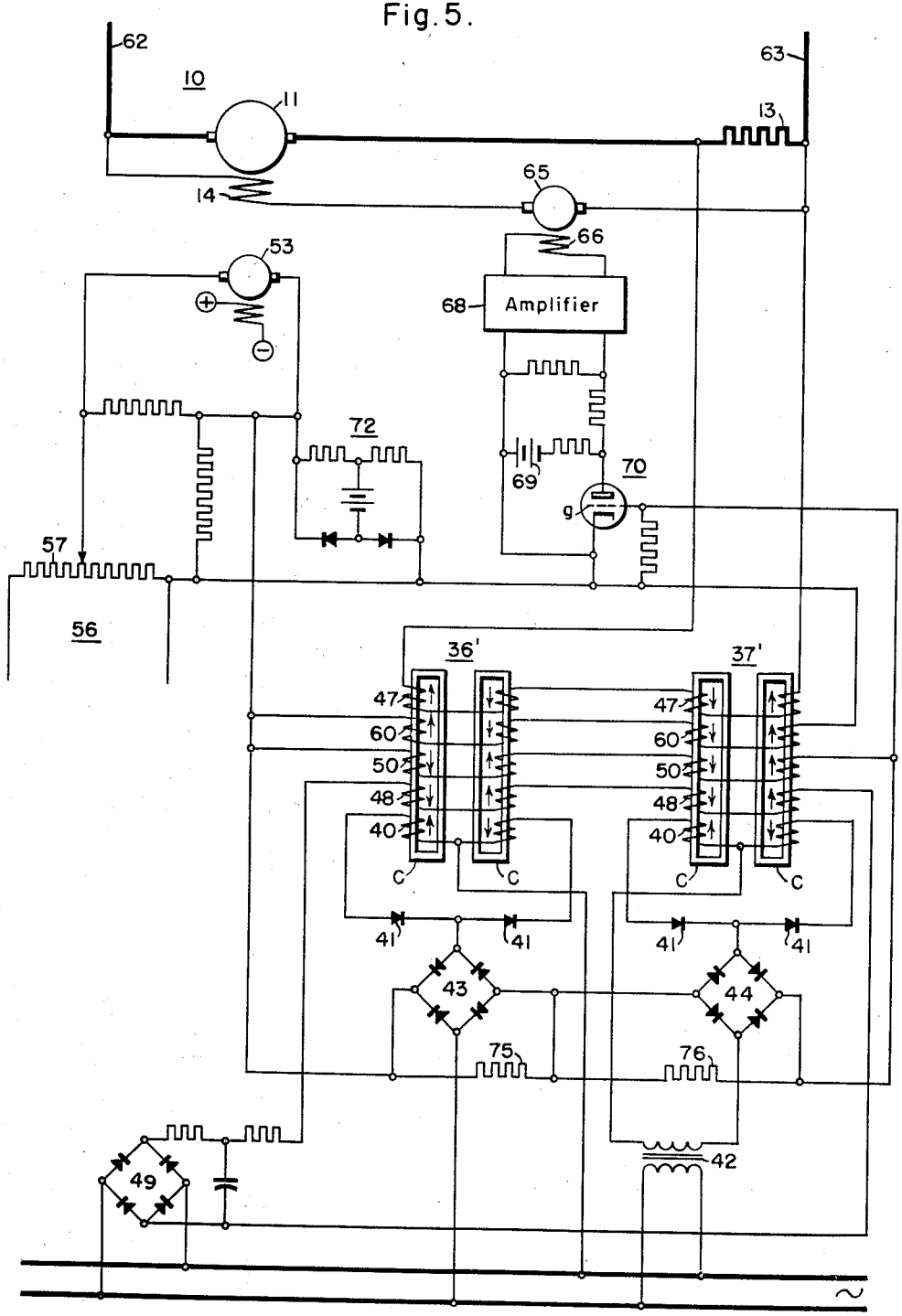
Fig. 5 is a schematic diagram of a motor control system embodying the invention in another of its forms.

Referring to Fig. 5, the reference numeral 10 denotes a motor having an armature 11 and a field winding 14. The armature is connected to a source of direct current represented by the conductors 62 and 63 while the field winding 14 is connected thereto through a booster generator 65 which is controlled by an amplifier 68 through a conventional electronic valve device 70, having a plate voltage source represented by a battery 69. A control signal is provided to the grid $g$ of the valve device 70 in accordance with the differential between the voltage of a pilot generator 53 driven by the motor 10 and the voltage derived from a source 56 through a rheostat 57. A conventional limiter circuit 72 is connected across pilot generator 53, source 56 and valve device 70 so as to limit to a predetermined value the difference voltage of pilot generator 53 and the source 56 which can be applied to grid $g$ of the valve 70.

In order to provide for current limit control of the motor 10 magnetic amplifiers 36' and 37' are provided having error windings 60 energized in accordance with the differential between the pilot generator 53 and the source 56, current windings 47 energized in accordance with the armature current of the motor 10 and load windings 40 which are connected to produce opposed voltages across resistors 75 and 76 connected in circuit with the grid of the valve device 70. The load windings 40 of the magnetic amplifiers 36' and 37' are energized from the alternating current source which energized the load windings, a transformer 32 being interposed between the source and the load windings of the magnetic amplifiers 37' to permit using a common connection between the rectifier circuits 43 and 44. Bias windings 48 are provided on each of the cores C for opposing the magnetic effects of the load windings 40, the bias winding being energized from the load winding source by a rectifier circuit 49 so as to minimize the effect of variations in voltage of the alternating current source. Feedback windings 50 are also provided on the cores so as to be energized in accordance with the differential between the pilot generators and the pilot source 56.

In operation, valve 70 and amplifier 68 normally respond to a differential between the voltage of the pilot generator 53 and the reference source 56 to vary the excitation of the field winding 14 and maintain a predetermined value of speed for the motor 10. Whenever the armature current tends to increase above a predetermined value during such a change, the magnetic amplifiers 36 and 37 are selectively operable to produce voltages across the resistors 75 and 76 under different operating conditions to modify the control of the valve 70 and amplifier 68 and hold the armature current to a limit during such change. Relative flux directions for the magnetic amplifier windings are shown for a condition of acceleration.

Referring to Fig. 7, the reference numeral 10 denotes a motor having an armature 11, series field winding 12 and a separately excited main field winding 14 which may be energized from any suitable source of excitation. The armature 11 is supplied with electrical energy from a variable generator 15 having an armature 16 connected in circuit with the armature 11 and series and main field windings 19 and 20. A field winding 20 is connected to a regulating generator 22 having an armature 23, a pattern field winding 24 disposed to be connected to a reversible reference source represented by the conductors 25' and 26' and a differential voltage control winding 32 connected across the armature 11 of the motor 10. The current limit windings 33 and 34 are also provided on the regulating generator 32.

Control of the current limit windings 33 and 34 is effected by magnetic amplifiers 36″ and 37″ each having pattern windings 45 connected to the reference source conductors 25' and 26', current windings 47 energized in accordance with the armature current of the motor 10, and differential voltage windings 46 energized in accordance with the armature voltage of the motor 10.

The current limit windings 33 and 34 are connected to an alternating current source through load windings 40 on the magnetic amplifiers and rectifier circuits 43 and 44, respectively, which are connected directly to the source and through a transformer 32 for the purpose of permitting a common connection between the rectifier circuits. Bias windings 48 are provided on each of the magnetic amplifiers in opposed relation to the load winding, the bias windings being energized from the alternating current source through a bridge circuit of rectifiers 49, for minimizing the effect of variations in the voltage of the alternating current source. Feedback windings 50 are also provided on the magnetic amplifiers being connected across their respective limit windings so as to reduce the gain and improve the stability of the system.

In order to hold essentially constant kilowatt output of the variable voltage generator 15 between substantially normal load and the maximum current limit point an additional winding 80 is provided on each of the magnetic amplifiers which is additive to the ampere turns of the pattern winding 45. The excitation for this winding is obtained by bucking the voltage of the generator 15 against a fixed bias obtained from a direct current source through a voltage divider 82 and applying this net voltage to the field winding 80 with a rectifier bridge circuit 84 connected between the reference source and the generator for obtaining the same relative direction of bias voltage for forward and reverse operation of the motor 10.

The voltage divider 82 can be set to a predetermined value to obtain point B on the volt ampere curve of generator 15. When the generator voltage is below the value represented by point B, no current flows in winding 80 because of the limit effect of rectifier 84 and voltage divider 82, and the operation of the system is as described for Fig. 1. However, when the voltage of generator 15 is greater than B, then this voltage exceeds that of voltage divider 82 and current flows in winding 80. As the generator voltage increases, current will be limited to values along solid line A—B of Fig. 6, since the effect of winding 80 is opposite to voltage winding 46 thus reducing its effect. The strength of winding 80 is determined by resistor 85, therefore, the slope of solid line A—B and the position of point A is determined by the adjustment of resistor 85. Since the volt ampere curve shown as curve dash line A—B would be the ideal volt ampere curve, the straight solid line A—A approaches it for practical purposes and the system maintains close to constant kilowatt output beyond operating point A. The arrows show the relative flux directions for the several magnetic amplifier and regulator windings for a charge from 0 to some positive value in the first quadrant.

From the above description and the accompanying drawings, it will be apparent that I have provided in a simple and effective manner for improving the accuracy by stabilizing the cut-off point of magnetic amplifiers in a current limit system. By utilizing negative feedback to reduce the gain necessitated by the addition of an opposing bias the stability of the system is maintained at a high level.

Since certain changes may be made in the above described construction and different embodiments of the invention may be made without departing from the scope and spirit thereof, it is intended that all the matter contained in the accompanying drawings should be considered as illustrative and not in a limiting sense.

I claim as my invention:

1. The combination with a motor having an armature and field winding, of means for supplying electrical energy to the armature including regulating means having a plurality of excitation windings, control means connecting one of said excitation windings to a reference source, circuit means connecting another of said excitation windings for energization in accordance with an electrical quantity of said armature, a magnetic amplifier having a load winding and a plurality of control windings, rectifier means connecting the load winding in circuit with yet another of said excitation windings, circuit means connecting one of said control windings to be energized in accordance with an electrical quantity from the armature, and means including a rectifier and a filter circuit connecting another of the control windings to the alternating current source to oppose the load windings.

2. In a control system for a motor means for supplying electrical energy to the motor including regulating means having a plurality of excitation circuits, magnetic amplifier means having a load winding and a plurality of control windings, means including a rectifier connecting the load winding in circuit with one of said excitation circuits and an alternating current source, circuit means connecting one of the control windings to be energized in accordance with an electrical condition of the motor, and means including a rectifier connecting another of the control windings to said alternating current source to provide a bias effect opposing the magnetomotive force of the load winding.

3. In a control system for a motor, a generator having an armature for supplying electrical energy to the motor and having a field winding, regulating means controlling energization of said field winding, said regulating means having a plurality of control windings, control means for reversibly effecting variable energization of one of said plurality of windings to provide a pattern winding( circuit means connecting another of said windings in shunt with the armature to oppose the pattern winding, and magnetic amplifier limit means having load windings connecting a pair of said plurality of windings to an alternating current source through rectifier bridge circuits in opposite senses, said magnetic amplifier means each having a pattern winding energized by said control means and bias windings energized from the alternating current source in opposed relation to the respective load winding.

4. In a control system for a motor having an armature and a field winding, circuit means connecting the field winding to a source of electrical energy, a generator having an armature connected in circuit with the motor armature and having a field winding, regulating means connected to control the supply of electrical energy to the generator field winding, said regulating means having a plurality of excitation windings, control means for reversibly connecting one of said windings to a source of reference voltage for a pattern, additional circuit means connecting another of the plurality of windings to the armature circuit to normally oppose the pattern winding, and magnetic amplifier means having a load winding connecting another of said plurality of windings to an alternating current source through a rectifier circuit, including a bias winding connected to the same alternating current source through a rectifier and opposing the magnetic effects of the load winding.

5. In a control system for a motor, means including a regulator having a plurality of control windings for supplying electrical energy to the motor, control means for variably energizing one of said windings as a pattern winding, circuit means connecting another of said windings for energization in response to an electrical condition of the motor in opposition to the pattern winding, a limit regulator having load windings connecting yet another of the control windings to a source of alternating current through a rectifier circuit and having a plurality of excitation windings, circuit means connecting one of said excitation windings to the alternating current source through a rectifier in opposition to the load winding as a bias winding, circuit means connecting yet another of said excitation windings to be energized in accordance with a different electrical characteristic of the motor cumulatively with respect to the load windings, and circuit means connecting another of said excitation windings to provide negative feedback in response to energization of said yet another control winding to limit the gain of the limit regulator.

6. In a control system for a motor having an armature and a field winding, circuit means connecting the field winding to a source of excitation, a generator having a field winding and an armature connected to supply electrical energy to the motor armature, means including a regulator responsive to the armature voltage for supplying excitation for the generator field winding, said regulator having a current limit winding, a current limit regulator having a load winding connecting the current limit winding to an alternating current source through rectifier means and having a plurality of control windings, circuit means connecting one of said windings to the alternating current source through a rectifier circuit in opposition to the load winding, a circuit connecting another of the control windings to be energized in accordance with the armature current of the motor and other circuit means connecting yet another of the control windings to be energized in accordance with the energization of the current limit winding in opposition to the load windings.

7. In a control system for a motor, means including a first regulator responsive to a differential between a voltage responsive to a physical condition of the motor and a reference voltage connected to supply electrical energy to the motor, a second regulator of the limit type having load windings for supplying control excitation to the first regulator from an alternating current source, through a rectifier under predetermined current conditions, said second regulator having a plurality of control windings, circuit means connecting one of said control windings to be energized in accordance with the motor current for limiting the value for which the first regulator regulates, circuit means connecting another of said control windings to be energized in accordance with the excitation supplied to the first regulator by the limit regulator, circuit means connecting another of the control windings to be energized in accordance with a differential between the reference and the voltage responsive to the regulated condition for minimizing deviation therebetween, and circuit means connecting yet another of the control windings to the alternating current source through a rectifier in opposed relation with the load winding for minimizing variation in the cut-off point due to variations in the voltage of the alternating current source.

8. In a speed regulating system for a motor, a first regulator responsive to the speed of the motor and a reference quantity for maintaining a predetermined motor speed, a second regulator responsive to the motor current for limiting the speed for which the first regulator regulates when the current reaches a predetermined value, said second regulator being of the magnetic amplifier type having load windings supplying current limit excitation to the speed regulator from an alternating current source through a rectifier circuit and having a plurality of control windings, circuit means connecting one of the control windings to the alternating current source through rectifier means in opposition to the load windings, circuit means connecting another of the control windings to be energized in accordance with the motor current to limit the speed for which the speed regulator regulates when the motor current exceeds a predetermined value, circuit means connecting another of the control windings to be energized in accordance with the current limit excitation supplied the speed regulator in opposition to the load windings, and circuit means connecting another of the control windings to be energized in accordance with a differential between the reference quantity and the motor speed for minimizing such differential.

9. In a control system for a motor having an armature and a field winding, means including a first regulator for normally regulating the excitation of a motor to maintain a predetermined operating condition, a second regulator of the limit type having magnetic core means with load windings thereon for supplying electrical energy to the first regulator from an alternating current source through a rectifier circuit and having a plurality of control windings, circuit means connecting one of the control windings to the alternating current source through a rectifier circuit in opposition to the load windings, circuit means connecting others of the winding to be energized cumulative and differentially in accordance with the motor armature current and voltage, respectively, and circuit means connecting yet another of the control windings to be energized cumulatively in accordance with the differential between the motor volage and a substantially fixed bias voltage.

10. In a control system for a motor, a first regulator having excitation means energized in accordance with a differential between the motor voltage and a reference quantity, a second regulator having load windings connecting the first regulator to an alternating current source through a rectifier circuit and having a plurality of control windings, circuit means connecting one of the control windings to be energized in accordance with the reference quantity for providing a pattern excitation, circuit means connecting another of the control windings to the alternating current source through a rectifier circuit opposing the load windings, circuit means connecting others of the control windings to be energized cumulatively and differentially respectively in accordance with the circuit means connecting still another of the control windings to be energized cumulatively in accordance with the differential between the motor voltage and a fixed reference voltage.

11. In a control system for a motor, means including a first regulator normally operable to regulate a voltage applied to the motor, a second regulator having a plurality of windings including windings energized responsive to the current and voltage of the motor in opposed senses and having another winding connected as a bias winding for limiting the voltage control of the first regulator to provide current limit control, circuit means connecting the motor and a reference source for applying a differential voltage to yet another of said windings effect control of the first regulator to maintain substantially constant power input to the motor over a predetermined range, and control means in said circuit means for varying the relative values of the reference and motor voltages applied to the second regulator.

12. A control system for a motor comprising, a voltage regulator operable to regulate the voltage applied to the motor, a limit regulator differentially responsive to the motor current and voltage for normally applying limit excitation to the voltage regulator in response to predetermined conditions of motor current and voltage to limit the armature current of the motor, circuit means connecting the motor and a source of bias voltage in opposed relation to the limit regulator for modifying the current limit effect and effecting power limit control of the voltage regulator to regulate for a predetermined power input over a predetermined operating range, and impedance means individually varying the motor and bias voltage applied to the limit regulator.

13. In a reversing control system for a motor having an armature and a field winding, circuit means connecting the field winding to a source of excitation, means including a first regulator for supplying electrical energy to the armature, circuit means for applying a control voltage to the first regulator in accordance with the motor voltage, control means for applying a reversible pattern voltage to said regulator, a second regulator operable to apply a limit signal to the first regulator, said second regulator having a pattern winding energized from the reversible pattern voltage, current and voltage windings energized in opposed senses in accordance with the armature current and voltage, and having a power control winding energized in accordance with the differential between the armature voltage and a fixed source of bias in opposition to the voltage winding.

14. In a control system for a motor having an armature and a field winding, means including a first regulator having a reversible pattern excitation and a control excitation responsive to the armature voltage for supplying electrical energy to the armature, a second regulator having a reversible voltage excitation from the motor armature and an opposing current excitation responsive to the motor armature current for supplying a current limit signal to the first regulator cumulatively with the voltage excitation thereof, means for applying a feedback signal to the second regulator from the first regulator in response to the rate of change of voltage by the first regulator, and a delay reactor connected in circuit with said means for delaying said feedback signal.

References Cited in the file of this patent
UNITED STATES PATENTS

| | | |
|---|---|---|
| 2,601,527 | Hunt | June 24, 1952 |
| 2,627,597 | Johansson | Feb. 3, 1953 |
| 2,677,085 | Sikorra | Apr. 27, 1954 |
| 2,735,053 | Storey et al. | Feb. 14, 1956 |

FOREIGN PATENTS

| | | |
|---|---|---|
| 495,605 | Canada | Apr. 27, 1951 |